United States Patent [19]

Kawamura et al.

[11] Patent Number: 4,912,385
[45] Date of Patent: Mar. 27, 1990

[54] TAPPING CONTROL APPARATUS

[75] Inventors: Hideaki Kawamura; Takao Sasaki, both of Hachioji, Japan

[73] Assignee: Fanuc Ltd., Minamitsuru, Japan

[21] Appl. No.: 221,249

[22] PCT Filed: Nov. 11, 1987

[86] PCT No.: PCT/JP87/00878
§ 371 Date: Jun. 28, 1988
§ 102(e) Date: Jun. 28, 1988

[87] PCT Pub. No.: WO88/03451
PCT Pub. Date: May 19, 1988

[30] Foreign Application Priority Data
Nov. 12, 1986 [JP] Japan .................. 61-269448

[51] Int. Cl.$^4$ ............................................ G05B 19/24
[52] U.S. Cl. ............................ 318/603; 318/632; 318/571; 364/474.29; 364/474.3
[58] Field of Search ................. 318/600–608, 318/618, 632, 568, 567, 569, 384, 391, 367, 392, 393, 396, 397, 404; 364/513, 474.29, 474.3, 474.4, 474.28, 474.35, 474.02

[56] References Cited

U.S. PATENT DOCUMENTS

| | | | |
|---|---|---|---|
| 4,471,443 | 9/1984 | Kinoshita etal. | 364/474.35 |
| 4,502,108 | 2/1985 | Nozawa et al. | 318/632 X |
| 4,543,625 | 9/1985 | Nozawa et al. | 364/474.29 X |
| 4,554,497 | 11/1985 | Nozawa et al. | 318/561 X |
| 4,571,687 | 2/1986 | Fukuyama et al. | 364/474.02 |
| 4,600,985 | 7/1986 | Nozawa et al. | 364/474.3 |
| 4,656,405 | 4/1987 | Kiya et al. | 318/571 |
| 4,675,490 | 6/1987 | Matsui et al. | 318/603 X |

Primary Examiner—William M. Shoop, Jr.
Assistant Examiner—Paul Ip
Attorney, Agent, or Firm—Staas & Halsey

[57] ABSTRACT

A tapping control apparatus effects tapping operation by synchronizing the rotation of a spindle and the movement along a Z-axis through pulse distribution. The tapping control apparatus has a time constant determining unit (2) for determining a time constant according to a command speed for the spindle. The determined time constant is given to an acceleration/deceleration control circuit (10, 20) for performing tapping operation. Since a time constant is selected according to the rotational speed of the spindle, the time constant can be large to prevent overshooting or the like when the rotational speed of the spindle can be high, and the time constant is small for higher-speed machining operation when the rotational speed of the spindle is low.

4 Claims, 1 Drawing Sheet

TAPPING CONTROL APPARATUS

BACKGROUND OF THE INVENTION

1. Field of the Invention

The present invention relates to a tapping control apparatus for controlling tapping operation of a numerically controlled machine tool, and more particularly to a tapping control apparatus for effecting high-speed, stable tapping operation by automatically determining an acceleration/deceleration constant for the rotational speed of the spindle of a machine tool.

2. Description of the Related Art

Demands for higher-speed machining operation require the tapping operation to be also carried out at higher speed. For tapping metals such as aluminum, it is necessary that the rotational speed of a spindle and the speed of feeding movement along a Z-axis accurately be in synchronism with each other. To meet this requirement, the conventional tapping process employing a floating tapper is replaced with a rigid tapping process which uses a rigid tapper and keeps the rotation of a spindle and the feeding movement along a Z-axis in synchronism through pulse distribution for tapping operation.

The applicant has filed two applications, Japanese Patent Applications Nos. 61-175868 and 61-175869 directed to the rigid tapping process. However, in the tapping disclosed in these applications only one time constant is used for acceleration/deceleration control of the rotation of the spindle and the feeding movement along the Z-axis, with the result that the problem of overshooting or the like is brought about when high-speed tapping operation is performed. If a large time constant is selected, the time required for machining is increased at low-speed operation.

SUMMARY OF THE INVENTION

It is an object of the present invention to provide a tapping control apparatus for effecting high-speed, stable tapping operation by automatically determining an acceleration/deceleration time constant for the rotational speed of the spindle of a machine tool.

In order to solve the aforesaid problems, there is provided in accordance with the present invention a tapping control apparatus for effecting tapping operation by synchronizing the rotation of a spindle and the feeding movement along a Z-axis through pulse distribution, said tapping control apparatus comprising:

time constant determining means for determining a time constant according to a speed command for the spindle;

and an acceleration/deceleration control circuit responsive to the determined time constant for effecting tapping operation.

Since the time constant is selected according to the command speed for the spindle, when the commanded speed of the spindle is high, the time constant is large, thereby preventing overshooting. When the commanded speed of the spindle is low, the time constant is small for high-speed tapping operation.

DESCRIPTION OF THE PREFERRED EMBODIMENT

Figure 1:
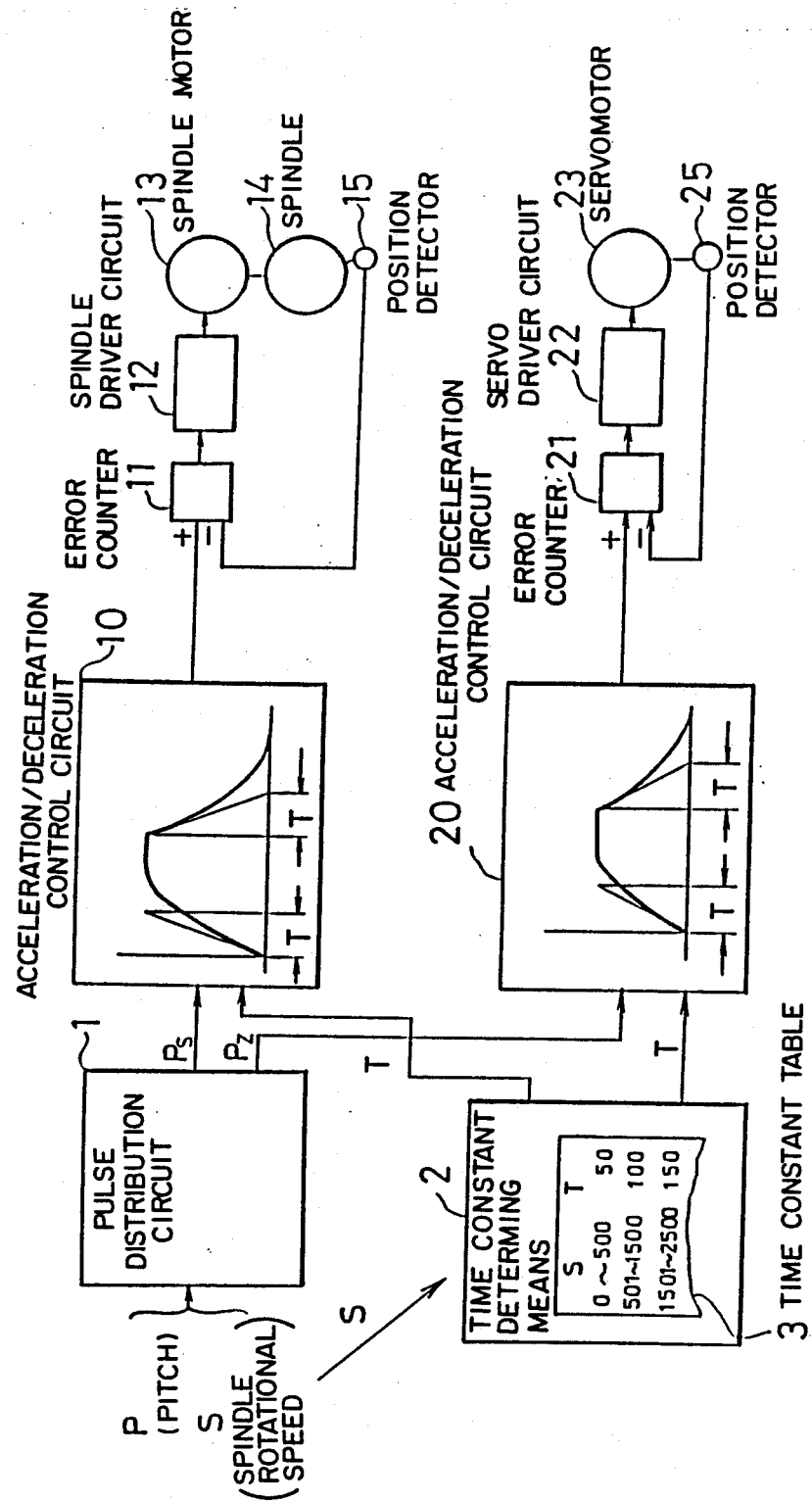
FIG. 1 is a block diagram of an embodiment of the present invention.

An embodiment of the present invention will hereinafter be described in specific detail with reference to the drawings.

FIG. 1 is a block diagram of an embodiment according to the present invention. Denoted in FIG. 1 at 1 is a pulse distribution circuit for issuing output pulses Ps for rotating a spindle and output pulses Pz for controlling feeding movement along a Z-axis, in response to commands P (the pitch of screw threads to be formed) and S (the rotational speed of the spindle). The pulses Ps, Pz are calculated in order to synchronize the rotation of the spindle and the movement along the Z-axis for tapping operation in conformity with the lead of screw threads. Specifically, assuming that the speed of Ps is converted to the rotational speed of the spindle S (rpm), the speed of Pz is indicated as Vz (mm/min.), and the lead of screw threads is indicated by P (mm), the pulses are distributed to meet the equation:

$$Vz(mm/min.) = S(rpm) \cdot P(mm)$$

Designated at 2 is a time constant determining means which has a time constant table 3 having time constants T corresponding to spindle rotational speeds S. When a spindle rotational speed S is commanded, a time constant T which corresponds to the commanded spingle speed is selected from the table 2. For example, time constants can be selected from the time constant table according to spindle rotational speeds, as follows:

| S (spindle rotational speed, rpm) | T (time constant, msec) |
| --- | --- |
| 0~500 | 50 |
| 501~1500 | 100 |
| 1501~2500 | 150 |

The selected time constant is sent to a acceleration/deceleration control circuits.

An acceleration/deceleration control circuit 10 for a spindle motor serves to accelerate and decelerate the distributed pulses Ps with a time constant T. An acceleration/deceleration control circuit 20 for movement along the Z-axis serves to accelerate and decelerate the distributed pulses Pz for the Z-axis with a time constant T.

The output pulses for the spindle, which have been controlled by the acceleration/deceleration control circuit 10, are fed to an error counter 11 to count up the same. The error counter 11 is counted up by the output pulses, and counted down by feedback pulses (described later). Therefore, the error counter 11 contains the difference between the output pulses and the feedback pulses, and the difference is converted to an analog command signal by a D/A converter (not shown). The analog command signal is then output from the error counter 11 to a spindle driver circuit 12 to control the rotation of a spindle motor 13. The spindle motor 13 is operatively coupled to a spindle 14 through gears (not illustrated) for rotating the spindle. To the spindle, there is coupled a position detector 15, either directly or through gears, for generating feedback pulses dependent on the rotation of the spindle. Although not shown in detail, the error counter 11, the spindle driver circuit 12, the spindle motor 13, the spindle 14, and the position detector 15 constitute a speed feedback loop in a known manner.

The output pulses for the Z-axis, which have been controlled by the acceleration/deceleration control circuit 20, are fed to an error counter 21 to count up the same. The error counter 21 is counted up by the output pulses, and counted down by feedback pulses (described later). Therefore, the error counter 21 contains the difference between the output pulses and the feedback pulses, and the difference is converted to an analog command signal by a D/A converter (not shown). The analog command signal is then fed from the error counter 21 to a Z-axis servo-driver circuit 22 to control the rotation of a Z-axis servomotor 23. The Z-axis servomotor 23 is operatively coupled to a Z-axis shaft through gears (not shown) for moving the Z-axis shaft. To the Z-axis servomotor 23, there is coupled a position detector 25 for generating feedback pulses dependent on the rotation of the Z-axis servomotor. Although not shown in detail, the error counter 21, the Z-axis servo-driver circuit 22, the Z-axis servomotor 23, and the position detector 25 constitute a speed feedback loop in a known manner.

Since a workpiece is tapped with a time constant T corresponding to a commanded spindle rotational speed S, the drawback of overshooting or the like is prevented even when the spindle rotational speed is high. When the spindle rotational speed is low, the time constant is selected to be small for higher machining speed.

While in the above embodiment the time constant determining means 2 employs the time constant table 3, it may be replaced with a means for determining an acceleration/deceleration time constant T expressed by:

$$T = KS$$

where S is the rotational speed of the spindle, and K is a constant.

With the present invention, as described above, inasmuch as an acceleration/deceleration constant is selected according to the speed command for the spindle by the time constant determining means, the problem of over-shooting or the like is not developed at high speed, and the tapping time is reduced at low speed.

We claim:

1. A tapping control apparatus for effecting tapping operation by receiving a speed command for a spindle, then synchronizing rotation of the spindle and feeding movement along a Z-axis through pulse distribution, said tapping control apparatus comprising:
   time constant determining means for determining a time constant according to the speed command for the spindle; and
   an acceleration/deceleration control circuit responsive to the time constant for effecting tapping operation.

2. A tapping control apparatus according to claim 1, wherein said time constant determining means included a table containing spindle rotational speeds and time constants corresponding to the spindle rotational speeds, respectively.

3. A tapping control apparatus according to claim 1, wherein said time constant determining means includes means for determining the time constant expressed by T, where $$T = KS,$$

S is the rotational speed of the spindle and K is a constant.

4. A tapping control apparatus for effecting a tapping operation by receiving a speed command for a spindle and controlling the rotational speed of the spindle and feeding movement along a Z axis, comprising:
   a pulse distribution circuit for synchronizing the rotation of the spindle and the feeding movement along the Z-axis;
   time constant means for determining a time constant according to the speed command for the spindle; and
   an acceleration/deceleration control circuit responsive to the time constant determined by said time constant means.

* * * * *

UNITED STATES PATENT AND TRADEMARK OFFICE
CERTIFICATE OF CORRECTION

PATENT NO. : 4,912,385
DATED : March 27, 1990
INVENTOR(S) : Kawamura et al.

It is certified that error appears in the above-identified patent and that said Letters Patent is hereby corrected as shown below:

Col. 3, line 27, change "When" to

--Moreover, when--;

Col. 3, line 39, delete "inas-";

Col. 3, line 40, change "much as"

to --since--;

Col. 4, line 16, change "included" to

--includes--.

Signed and Sealed this

Twenty-first Day of May, 1991

Attest:

HARRY F. MANBECK, JR.

Attesting Officer

Commissioner of Patents and Trademarks